S. C. GORDON.
STEERING GEAR.
APPLICATION FILED JULY 24, 1915.
1,209,144.
Patented Dec. 19, 1916.
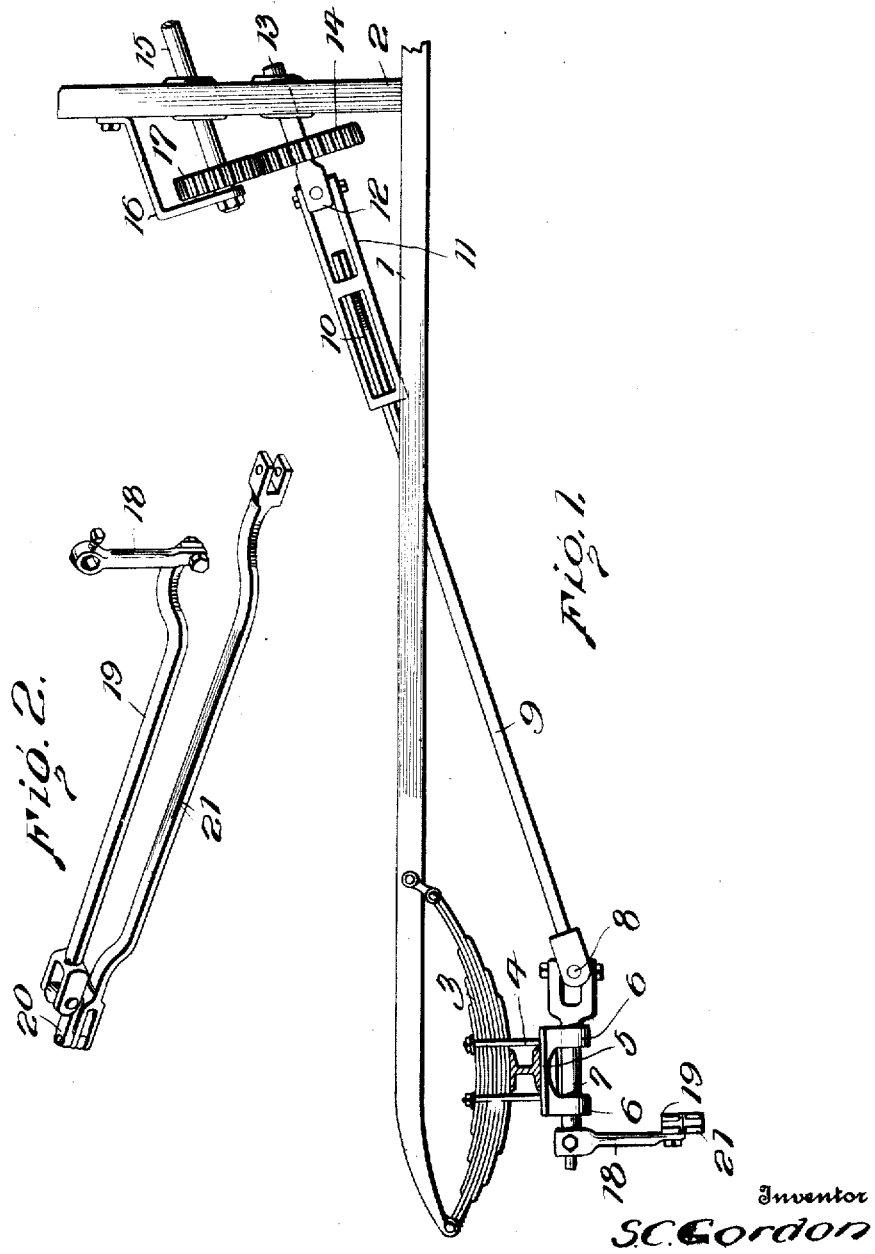
Inventor
S. C. Gordon

UNITED STATES PATENT OFFICE.

SAMUEL C. GORDON, OF RICHMOND, VIRGINIA.

STEERING-GEAR.

1,209,144.   Specification of Letters Patent.   Patented Dec. 19, 1916.

Application filed July 24, 1915. Serial No. 41,788

*To all whom it may concern:*

Be it known that I, SAMUEL C. GORDON, a citizen of the United States, residing at Richmond, in the county of Henrico and State of Virginia, have invented certain new and useful Improvements in Steering-Gears, of which the following is a specification.

This invention relates to steering gear for automobiles, and has for its primary object the provision of a mechanism by which the steering wheels may be easily manipulated and maintained in a position in which they are set and will be permitted to yield to obstructions in the road without deflecting the vehicle from its line of travel.

A further object of the invention is to provide means whereby the steering mechanism may be so mounted that the shocks incidental to travel over rough roads will not reach the chauffeur and will not affect the movement of the steering wheels, and other incidental objects of the invention will appear as the description of the same proceeds.

The invention is illustrated in the accompanying drawings and consists in certain novel features which will be particularly pointed out in the claim following the detailed description.

In the drawings:—Figure 1 is a side elevation of a steering gear embodying my invention; Fig. 2 is a detail perspective view of a portion of the same.

The frame of the vehicle may be of any desired form and is indicated conventionally at 1, a dash 2 of any desired form being erected thereon, and a vehicle spring 3 being provided at the front end of the same. To the said spring 3, I secure by clips 4 a bracket 5 having depending lugs or ears 6 in which is journaled a tumbling rod or shaft 7. The rear end of this tumbling rod or shaft is connected by a universal coupling 8 with a rod or shaft 9 extending upwardly and rearwardly and having its rear end formed angular in cross section, as indicated at 10. This angular end 10 slidably engages a coupling 11 which is connected by a universal joint 12 to a shaft 13 journaled in a suitable bearing in the dash 2 and carrying a spur wheel 14. The steering column 15 is mounted in a suitable bearing in the dash above the shaft 13 and has its front end supported by a bracket 16 secured upon the front side of the dash, as clearly shown. A pinion or spur wheel 17 is secured upon the steering column and meshes with the spur wheel 14 whereby movement imparted to the steering column by the chauffeur will be transmitted to the shaft 13 and through the connections therewith to the tumbling rod or shaft 7. To the front end of said shaft or rod 7, I secure a lever or crank arm 18 having its lower end pivoted to a link 19 which is disposed transversely of the vehicle and has its end distant from the lever 18 connected by a universal joint 20 to a tie rod 21, the ends of said tie rod being connected in the usual manner with the stub axles which carry the steering wheels of the vehicle.

It will be readily noted that the shaft or rod 7 is carried by the axle so that the jars and shocks to which the steering wheels are subjected by travel over a rough road will not release the steering wheels or permit them to shift angularly and thereby deflect the vehicle from its line of travel.

It will be noted that, when the front wheels strike an obstruction, the upward movement of the wheels will be accommodated by the shaft or rod 9 sliding in the coupling 11 so that the shock will be absorbed and the strain and discomfort ordinarily placed upon the hands and wrists of the chauffeur will be overcome.

It will be noted that the steering wheels are moved through a rotary shaft carried by the vehicle spring and a telescopic joint is interposed between the steering column and the said rotary shaft so that the vertical movement of the steering wheels will be accommodated without imposing any additional strain upon the vehicle springs or transmitting any shock to the steering column or the vehicle body. The movement of the springs, in arrangements heretofore employed, has affected the movement of the steering rod which reciprocated horizontally but my device imparts a rotary movement to said member which is, consequently, not varied by any movement of the springs. The interposition of the gears, as shown and described, will tend to hold the steering wheels in the position in which they may be set so that deflection of the vehicle from its prescribed line of travel will not occur.

The device is exceedingly simple and may be readily applied to any motor vehicle.

Having thus described the invention, what is claimed as new is:—

In a steering mechanism, the combination with a vehicle frame, and the axle therefor, of a steering column mounted in a fixed bearing on the frame, a spur wheel thereon, a shaft disposed parallel with the steering column, a spur wheel on said shaft meshing with the spur wheel on the steering column, an elongated coupling, a universal joint connecting said coupling to said shaft, a rock shaft carried by the axle, a rod connected by a universal joint to the rock shaft and having an end of angular cross section slidably engaging said coupling, a lever on the rock shaft, and means for connecting said lever with the vehicle wheels.

In testimony whereof I affix my signature.

SAMUEL C. GORDON. [L. S.]